United States Patent Office 3,309,343
Patented Mar. 14, 1967

3,309,343
MONOMERIC ε-CAPROLACTAM COMPOSITIONS
Walter T. Darnell, Vienna, W. Va., Charles F. Fisher, Wilmington, Del., and Robert E. Maier, Northbrook, Pa., assignors to E. I. du Pont de Nemours and Company, Wilmington, Del., a corporation of Delaware
No Drawing. Filed Oct. 22, 1964, Ser. No. 405,825
17 Claims. (Cl. 260—78)

This application is a continuation-in-part of our copending application S.N. 131,493 filed Aug. 15, 1961, now abandoned.

This invention is concerned with ε-caprolactam compositions, particularly ε-caprolactam compositions useful in the manufacture of 6-nylon by fast polymerization of ε-caprolactam. More particularly, this invention is concerned with solid storable catalyzed ε-caprolactam compositions which are useful in the manufacture of 6-nylon by anionic polymerization of ε-caprolactam in the presence of a cocatalyst or a synergistically active cocatalyst combination.

The additive polymerization of ε-caprolactam to give the polyamide, 6-nylon, has been known for a number of years. The first processes for making a polymer employed small amounts of acidic materials or water as catalyst and required long periods of heating, i.e., several hours or even days of processing time. Subsequently, formation of the polymer was facilitated by use of anhydrous caprolactam in the presence of a base, namely, alkali or alkaline earth metals, their hydrides, hydroxides, alkoxides, amides, metal alkyls and other metal compounds at temperatures above 200° C., usually above 225° C. where the polymer existed in molten condition. The active catalytic agent in these polymerizations generally is believed to be an anion which is formed by the reaction of the metal or its derivative with caprolactam. The volatile by-products of this reaction such as hydrogen, water, alcohol, ammonia and the like automatically were eliminated at the high processing temperature, sometimes under conditions of reduced pressure.

More recently, procedures have been disclosed for accelerating remarkably the rate of the alkaline-catalyzed or anionic polymerization of caprolactam by addition to the anhydrous system of certain cocatalysts (i.e., promoters) and cocatalyst mixtures whereby the polymerizations are even more nearly complete at lower temperatures and in much shorter times than prevailed before use of the cocatalysts. Thus, polymerizations are accomplished in a few minutes at temperatures well below the softening or fusion point of the 6-nylon.

The fast polymerization of ε-caprolactam greatly facilitates the manufacture of shaped articles such as castings, moldings, extrusions, and the like of 6-nylon and minimizes the cost thereof because the molten caprolactam compositions are sufficiently fluid to fill molds and dies completely without formation of voids or blisters; the throughput is high since the shaped article is formed quickly at a temperature below the softening or fusion temperature of the polymer and hence can be removed from the die or mold without delay to permit heat transfer from the molten polymer and solidification thereof; thermal decomposition products are avoided; the very slight shrinkage of the polymerized compositions permits its easy and complete removal from the mold; and because of the excellent physical properties which are obtained without further processing of the finished polymer.

In the fabrication of plastic articles, shaping operations such as molding and casting often and sometimes predominantly are carried out by fabricators who are not located near the source of their raw material, which usually is the product of chemical manufacturing operations. Fabricators, moreover, desire and expect to receive their intermediate raw material in a form which requires a minimum of processing before subjecting it to the forming and shaping operations. For this reason, fabricators generally have not been able to take full advantage of the unique processing characteristic of the rapid polymerization of caprolactam to 6-nylon. Thus, in the usual sequence of operations, the catalyst for the polymerization is made by dehydrating ε-caprolactam, melting (if not dehydrated in the molten condition), adding and mixing the metal or metal derivative with the caprolactam and heating the mixture in the range of 69–200° C. while sparging the mixture with inert gas or heating at reduced pressure to remove volatile reaction products. The cocatalyst or synergistically active cocatalyst mixture then is added to the catalyzed caprolactam, and the total composition is placed in a mold or other shaping apparatus to complete the polymerization at a temperature below the softening or fusing point of the polymerized material. The fabricators usually desire to be free of as many of these processing steps as possible.

We have found that the foregoing difficulties may be obviated and a highly adaptable and storable molding composition provided when we introduce into molten ε-caprolactam with exclusion of oxygen and moisture a quantity of an additive, i.e., a base, selected from the alkali metals, alkaline earth metals, or derivatives thereof sufficient to provide from 0.01 to 10 mole percent by weight of said alkali metal or alkaline earth metal in the composition thus produced; maintain the said composition in the molten state and at a temperature between 69 and 200° C. until reaction between said caprolactam and said base is complete thus forming the anionic catalyst, which is, alternatively expressed, the caprolactam anion and the associated metallic cation; remove from said molten composition any volatile by-products of the said reaction; and thereafter solidify the said composition by reducing the temperature thereof between about 70°–100° C. and preferably 70°–80° C.; the composition being maintained in the substantial absence of moisture during and following solidification. This solid composition may be used directly in a fabricator's molding operation by simply melting, incorporating the cocatalyst, introducing the mixture into the mold, and maintaining the mixture at a temperature sufficient to induce polymerization, a convenient operating temperature being from about 150° C. to about 190° C. The resulting polyamide composition is, immediately thereafter, cooled to a temperature no higher than about room temperature until said composition has solidified.

Alternatively, the cocatalyst may be added to the catalyzed caprolactam composition immediately prior to solidification at a temperature below that at which substantial polymerization occurs. In still another embodiment of this invention, the solidified catalyzed caprolactam composition is granulated and solid finely divided cocatalyst admixed with the granulated composition. In either of the latter two embodiments, the addition of cocatalyst just prior to the molding operation is obviated. In each of the foregoing, the term "cocatalyst" embraces not only the compound itself, and synergistically active mixtures of compounds, but also the reaction products of said compounds or mixtures with ε-caprolactam or the catalyzed ε-caprolactam.

The following examples describe the new and useful ε-caprolactam compositions, and illustrate their preparation and the advantages of their use in the fabrication of shaped objects of 6-nylon. In the examples, parts are by weight based on the amount of ε-caprolactam included in the composition, unless otherwise indicated.

EXAMPLE 1

In a tubular glass reactor having an open upper end were placed 100 parts of ε-caprolactam and 0.25 part of solid potassium hydroxide. The mixture was held at 175° C. for 10 minutes and sparged by a current of dry nitrogen. While maintaining the flow of dry nitrogen above the level of the liquid contents, the reactor and contents were cooled to room temperature so that the prepared catalyzed caprolactam solidified. The solid thus prepared was stored, with exclusion of moisture, for 48 hours at room temperature. The reactor then was placed in a heating bath and the catalyzed caprolactam was brought to a temperature of 175° C. while still excluding air and water vapor. To the molten composition was added 0.5 part of phenyl isocyanate and the mixture was stirred. An exothermic polymerization reaction set in, and the contents of the reactor solidified within approximately 15 seconds. The resulting polymer was easily removed from the reactor and was hard and tough.

EXAMPLE 2

This example illustrates a solid storable catalyzed caprolactam composition which contained a different catalyst and which was polymerized in the presence of a different cocatalyst.

A mixture of 5 parts of caprolactam and 0.25 part of sodium hydride was heated for 10 minutes at 175° C. with nitrogen sparging, then cooled, solidified, pulverized and stored, all in the absence of moisture and oxygen. After 24 hours the catalyzed caprolactam composition was melted with exclusion of moisture and oxygen, brought to 165° C., and mixed with 0.033 part of phenyl isothiocyanate. The mixture became viscous in a few minutes and formed a solidified polymer in about 20 minutes.

EXAMPLE 3

This example illustrates a solid polymerizable catalyzed caprolactam composition which contained a different catalyst and was retained in storage for a longer period of time.

A mixture of 113 parts of anhydrous caprolactam and 1.0 mole percent of sodium methylate was heated for 85 minutes at 118° C. while being sparged with dry nitrogen. The catalyzed caprolactam composition was solidified by cooling and stored at room temperature in the absence of moisture. When a portion of this material was heated to 150° C. with exclusion of moisture and oxygen (to minimize color formation) and mixed with 0.2 mole percent of methylene bis(4-phenyl isocyanate) as cocatalyst, exothermic polymerization occurred with formation of solid polymer. The time for the polymerizing mixture to reach peak temperature was 2.1 minutes.

After 26 days of storage at room temperature with exclusion of moisture and oxygen, another portion of the catalyzed caprolactam composition was polymerized with the same cocatalyst exactly as described above. In this case the time to reach the peak temperature during polymerization was 2.7 minutes. This comparison shows that the solid catalyzed caprolactam composition underwent substantially no change during extended periods of storage in the absence of moisture and oxygen.

In a similar way, many large scale runs have been made to prepare solidified catalyzed caprolactam compositions from anhydrous caprolactam and sodium methylate at even lower temperatures. The compositions have been held in anhydrous storage for various periods of time during which portions have been withdrawn for use in making 6-nylon transfer moldings, centrifugal castings, and foams.

The above examples illustrate several storable solid caprolactam compositions which conveniently can be used by the plastics fabricator without having to employ separate chemical processing operations at the point of use. In all of these the cocatalyst was added at the place and time at which the catalyzed caprolactam composition was converted to 6-nylon. The following examples illustrate other storable, solid polymerizable catalyzed caprolactam compositions in which the cocatalyst is incorporated in different ways.

EXAMPLE 4

This example illustrates the preparation of a storable solid caprolactam composition which contains both the catalyst and cocatalyst.

In a reactor were placed 320 parts of anhydrous ε-caprolactam and 1.58 parts of sodium methoxide. The mixture was heated to 150° C. and was held at this temperature while being sparged with dry nitrogen for 20 minutes. The mixture was cooled to 85° C., to it was added 0.85 part of phenyl isocyanate, and the resulting mixture was cast into a cylindrical mold ¾ inch in diameter which was then closed to exclude oxygen and moisture. After the solid mixture had stood at room temperature for one day, sections of the cylindrically shaped composition were cut off and molded into physical test specimens using a 1-oz. capacity Watson-Stillman injection molding press the heating cylinder of which was held at 90° C., and the mold in successive trials was heated to 150, 170, and 190° C. The hold time in the mold of the press was between 5 and 10 minutes. In each case the 6-nylon test bars were removed from the mold without precooling it, and the bars were well formed of tough high polymer.

EXAMPLE 5

This example illustrates a similar composition which was processed and used in a different manner.

A mixture of 600 parts of anhydrous caprolactam and 1.0 mole percent (based on the caprolactam) of sodium methylate in a suitable reactor was held at 150° C. while being sparged for 20 minutes by dry nitrogen. The mixture was cooled to 80° C. and agitated after adding 0.25 mole percent of phenyl isocyanate based on the weight of the caprolactam. The homogeneous melt was solidified by cooling to room temperature, and the solid was broken up in an atmosphere free of water, then stored at room temperature under dry nitrogen.

A portion of the above solid catalyzed caprolactam composition was placed in a test tube which was immersed in a bath held at 160° C., with exclusion of oxygen and water vapor at all times. Polymerization occurred readily so that the no-flow condition was reached in 4 minutes after the composition had been brought to the bath temperature. The "no-flow time" refers to the period required for the molten mass to become sufficiently viscous that the meniscus remained undisturbed when the test tube was tilted through an angle of about 45° C.

After the solid granular catalyzed composition had been held in storage for nine weeks and two days, another sample was withdrawn for a polymerization test as described above. The no-flow time again was 4 minutes. The solid 6-nylon composition obtained by holding the test tube in the 160° C. bath for a longer period of time had a density of 1.1486 g./cc.

EXAMPLE 6

This example illustrates a two-part solid catalyzed caprolactam composition one part of which included the catalyst and another the cocatalyst, the two parts being mixed at the time of use, and the mixture then being polymerized by raising its temperature.

(A) Twenty parts of technical caprolactam containing 0.1 weight percent of potassium hydroxide was placed in a test tube and heated to 175° C. while being sparged with a flow of dry nitrogen gas for 12 minutes to remove the water of reaction. This caprolactam composition solidified on cooling and was then broken up and stored at room temperature in a dry atmosphere.

(B) A mixture of 5 parts of anhydrous caprolactam and 2 wt. percent (based on the lactam) of phenyl isocyanate was dry-blended in a mortar at room temperature in a dry atmosphere.

Ground caprolactam Composition A was blended with Composition B in a mortar at room temperature in a dry atmosphere, and the mixture in a test tube was placed in an oil bath maintained at 180° C. After 18 minutes the mixture was converted to solid polymer having a dilute relative viscosity $(\eta r)_D$ of 1.24 which indicated an average degree of polymerization greater than 600.

EXAMPLES 7 THROUGH 10

The procedure of Example 5 is repeated using the following proportions of catalysts and cocatalysts. The amounts of caprolactam were identical to those used in the example.

| Example No. | Cosatalyst | Mol. Percent Cocatalyst | Catalyst | Mol. Percent Catalyst |
|---|---|---|---|---|
| 7 | Diphenylcarbamyl imidazole | 0.4 | NaH | 1.5 |
| 8 | Sebacoyl bis(pyrazole) | 0.4 | NaH | 1.5 |
| 9 | Diplenyl carbonate | 0.5 | NaH | 1.5 |
| 10 | Diphenyl isophthalate | 0.6 | NaNH$_2$ | 1.5 |

The no-flow times of the above compositions when heated to 150° C. are all less than five minutes. The polymers obtained are tough.

EXAMPLES 11 THROUGH 27

The procedure of Example 6 is repeated using the following proportions of catalysts and cocatalyst with the same quantities of caprolactam.

| Example No. | Cosatalyst | Mol. Percent Cocatalyst | Catalyst | Mol. Percent Catalyst |
|---|---|---|---|---|
| 11 | 1,1'-terephthaloylbis(pyrazole) | 0.4 | NaH | 1.5 |
| 12 | 1,1'-oxalylbis(pyrazole) | 0.4 | KH | 1.5 |
| 13 | 1,1'-terephthaloylbis(carbazole) | 0.4 | NaH | 1.5 |
| 14 | 1-diphenylcarbamylpyrazole | 0.2 | NaOCH$_3$ | 1.6 |
| 15 | 1-phenylcarbamyl-1,2,3-triazole | 0.4 | NaH | 1.5 |
| 16 | Tetramethyl-1,3-cyclobutanedione | 0.4 | NaOCH$_3$ | 1.6 |
| 17 | 2,2,4-trimethyl-3-hydroxy-3-pentenoic acid β-lactone | 0.4 | NaH | 1.5 |
| 18 | 1,3,5-triphenoxy-s-triazine | 0.2 | NaOCH$_3$ | 1.5 |
| 19 | 1-dimethylamino-3,5-dichloro-s-triazine | 0.2 | NaOCH$_3$ | 1.5 |
| 20 | 1,3-diphenoxy-5-phenyl-s-triazine | 0.2 | NaOCH$_3$ | 1.5 |
| 21 | 1,3-dichloro-1,1,3,3-tetrafluoroacetone | 0.4 | NaOCH$_3$ | 3.0 |
| 22 | N-phenylbenzimido chloride | 0.5 | NaOCH$_3$ | 2.0 |
| 23 | N-methylbenzimido chloride | 0.5 | NaOCH$_3$ | 2.0 |
| 24 | Dicaprolactim ether | 2.0 | NaOCH$_3$ | 3.0 |
| 25 | Phenyl acetate | 0.4 | NaH | 2.0 |
| 26 | 1,2,3-acetoxybenzene | 0.4 | NaH | 2.0 |
| 27 | Poly(2,2-propane bis(4-phenylcarbonate)) | 0.4 | NaH | 1.5 |

The no-flow times of the above compositions at 150° C. (after mixing the catalyst and cocatalyst component) are all below 5 minutes. Tough polymers are obtained.

The examples described above include only a few of the possible storable solid catalyzed caprolactam compositions which fall within the scope of this invention. All of these compositions comprise caprolactam plus a basic catalyst which results by reaction of ε-caprolactam with alkali and alkaline earth metals and their compounds, and optionally may include cocatalysts and synergistically active cocatalyst mixtures in the same or separate caprolactam-based compositions. Any cocatalyst compound capable of causing polymerization of the caprolactam can be used in this invention. The cocatalysts or promoter compounds are usually derived from organic and inorganic acids of particular types. Effective cocatalysts are acyl compounds, i.e. compounds having the structure C=X where X can be sulfur, oxygen or nitrogen, the unsatisfied valences of carbon being substituted with any organic radical, preferably not having more than twenty carbon atoms. Representative of the acyl compounds that can be used as cocatalysts are, for example, acyl halides, anhydrides, imides, organic isocyanates, ketenes, alpha-halogenated ketones, N-acetyl caprolactam and substituted ureas. Specifically desirable are N-substituted imides having the structural formula

wherein A is a radical such as carbonyl, thiocarbonyl, imino, sulfonyl, phosphinyl, and thiophosphinyl radicals, B is a radical of the group A nitroso, R is a radical such as A, hydrocarbyl, and heterocyclic radicals and derivatives thereof, wherein said radicals in turn can contain radicals such as carbonyl, thiocarbonyl, sulfonyl, nitroso, phosphinyl, thiophosphinyl, tertamino, acylamido, N-substituted carbamyl, N-substituted carbamido, alkoxy, ether groups and the like, A and B, or A and R, together can form a ring system through a divalent linking group, and any free valence bond of the A and B radicals can be hydrogen or R, excepting A directly linked thereto.

Other acyl cocatalyst compounds that are suitable for use in the present invention are further described in British Patent 863,859 published Mar. 29, 1961, British Patent 872,328 published July 5, 1961, British Patent 842,576 published July 27, 1960, Australian Patent 218,129 published Jan. 16, 1958, Australian Patent 228,445 published May 8, 1958, Australian Patent 231,825 published Oct. 22, 1959, German Patent 1,067,591 published Oct. 22, 1959, German Patent 1,067,587 published Oct. 22, 1959, Belgian Patent 592,979 published Jan. 16, 1961.

Other cocatalysts that are particularly suitable are aromatic carbonate esters having at least one carbocyclic aromatic group attached to the carbonate (e.g., the polycarbonate of 4,4'-dihydroxydiphenyl-2,2-propane) which is the subject of copending application Ser. No. 242,895, filed Dec. 7, 1962 now U.S. Patent 3,207,713, and assigned to the assignee of the present application. Still another desirable cocatalyst is 2,2,4-trimethyl-3-hydroxy-3-pentenoic acid β-lactone, which is the subject of copending application Ser. No. 229,161, filed Oct. 8, 1962 now U.S. Patent 3,214,415, and assigned to the assignee of the present application. The acyl-bis heterocyclic compounds (e.g., sebacoyl-bis pyrazole) disclosed in copending application Ser. No. 266,810 which was filed on Mar. 21, 1963, now U.S. Patent 3,206,418 and assigned to the assignee of the present application, are also desirable co-catalysts. The triazine derivatives (e.g. the caprolactam derivatives of triazines) disclosed in copending application Ser. No. 155,791, which was filed on Sept. 5, 1961 and was assigned to the assignee of the present application, is still another desirable class of cocatalysts, also diphenyl carbamyl heterocyclic compounds (e.g., diphenylcarbamylimidazole) disclosed in copending application Ser. No. 274,803 filed Apr. 22, 1963, now U.S. Patent 3,274,132 are suitable cocatalysts that may be employed in this invention.

Accordingly, from the above description and specific working examples, it can be seen that any compound that functions as a cocatalyst can be used in the present invention and such compounds are well known to those skilled in the art.

The catalyst is the well-known anionic polymerization catalyst. This catalyst is prepared from a base such as alkali and alkaline earth metals such as lithium, sodium, potassium, magnesium, calcium, strontium, etc., either in metallic form or in the form of hydrides, borohydrides, amides, oxides, hydroxides, carbonates, etc.; organo-metallic derivatives of the foregoing metals, as well as other metals, such as butyl lithium, ethyl potassium, propyl sodium, phenyl sodium, triphenylmethyl sodium, and diphenyl magnesium by reaction of the base with caprolactam.

The proportion of the catalyst may vary from about 0.01 to 10 mole percent of the ε-caprolactam, but generally will be in the range of 0.2 to 5 mole percent of the lactam. As indicated before the active catalyst is the iminium ion formed by the reaction of a base with caprolactam but the proportions given for the catalyst refer to the base added and not to any reaction products it may form.

The proportion of cocatalyst or synergistically active combination of cocatalyst, if included, may vary from 0.02 to 5 mole percent of the ε-caprolactam, but generally will be in the range of 0.1 to 2.0 mole percent of the lactam.

The temperature used for preparing the catalyzed caprolactam compositions generally will be between 69 and 200° C., but preferably within the range of 80–120° C. When a cocatalyst is added after the anion has been formed in the composition, the temperature of the caprolactam composition at the time the cocatalyst is added may vary from 0° to 130° C., but preferably will be in the range of 20°–90° C. In all cases, the catalyzed caprolactam composition must be protected from moisture until the composition has been converted to polymer.

Optionally, the solid, substantially anhydrous storable, catalyzed ε-caprolactam composition may include soluble coloring agents, pigments, mold release agents, fillers and the like provided that such optional components are anhydrous, are unreactive with other components of the composition, and do not interfere with the polymerization of caprolactam.

As is apparent from the foregoing examples, the solid storable catalyzed ε-caprolactam compositions of the present invention offer a unique contribution to the art of making 6-nylon polymer compositions and objects composed thereof in practical commercial operations, as well as in experimental demonstrations.

Various modifications of the invention as described above will be apparent to those skilled in the art. Hence, it will be understood that the invention is not limited to the foregoing description except as it is defined in the appended claims.

What is claimed is:
1. Solid substantially anhydrous ε-caprolactam compositions, polymerizable at temperatures of from about 150° to 190° C., storable at room temperature, consisting essentially of ε-caprolactam containing, as anionic catalyst, the caprolactam anion and an associated basic metallic cation, and a cocatalyst which is capable of causing polymerization of anionically catalyzed caprolactam upon fusion and heating to temperatures in the range of from about 150° to 190° C.

2. A composition of claim 1 wherein the proportion of anionic catalyst is from 0.01 to 10 mole percent and the proportion of cocatalyst is from 0.02 to 5 mole percent, both proportions being based on the caprolactam.

3. Solid, anhydrous, ε-caprolactam compositions, polymerizable at temperatures of from about 150° to 190° C., storable at room temperature, consisting essentially of ε-caprolactam containing, as anionic catalyst, the caprolactam anion and an associated basic metallic cation and, as cocatalyst, an acyl compound which is capable of causing polymerization of anionically catalyzed ε-caprolactam upon fusion and heating to temperatures in the range of 150° to 190° C.

4. A composition of claim 3 in which the proportion of anionic catalyst is from 0.01 to 10 mole percent and the proportion of cocatalyst is from 0.02 to 5 mole percent, both proportions being based on the caprolactam.

5. A composition of claim 3 in which the cocatalyst is an organic isocyanate.

6. A composition of claim 3 in which the cocatalyst is poly(2,2-propane bis(4-phenylcarbonate)).

7. A composition of claim 3 in which the cocatalyst is the β-lactone of 2,2,4-trimethyl-3-hydroxy-3-pentenoic acid.

8. A process for preparing a solid, substantially anhydrous caprolactam composition which consists essentially of heating ε-caprolactam in the substantial absence of oxygen and water to a temperature in the range of 69° to 200° C. with a base selected from the group consisting of the alkali metals, the alkaline earth metals and basic derivatives thereof which are reactive with caprolactam to form the caprolactam anion, until volatile reaction by-products are eliminated, adjusting the temperature of the resulting composition within the range of from about 70° to 100° C., then adding and dispersing therein a cocatalyst capable of causing polymerization of the catalyzed composition at temperatures in the range of about 150° to 190° C., and, immediately thereafter, cooling the composition to a temperature no higher than room temperature until the composition has solidified.

9. A process for preparing a solid, substantially anhydrous caprolactam composition which consists essentially of heating ε-caprolactam in the substantial absence of oxygen and water to a temperature in the range of 69° to 200° C. with a base selected from the group consisting of the alkali metals, the alkaline earth metals, and basic derivatives thereof which are reactive with caprolactam to form the caprolactam anion, until volatile reatcion by-products are eliminated, adjusting the temperature of the resulting composition to the range of 70° to 100° C., then adding and dispersing therein, as cocatalyst, an acyl compound capable of causing polymerization of the catalyzed composition at temperatures in the range of about 150° to 190° C., and, immediately thereafter, cooling the composition to a temperature no higher than room temperature until the composition has solidified.

10. The process of claim 9 in which the catalyst-forming agent is sodium hydride, the volatile by-product being hydrogen.

11. The process of claim 9 in which the catalyst-forming agent is sodium methylate, the volatile by-product being methanol.

12. The process of claim 9 in which the catalyst-forming agent is sodium hydroxide, the volatile by-product being water.

13. The process of claim 9 in which the cocatalyst added is an organic isocyanate.

14. The process of claim 9 in which the cocatalyst added is poly(2,2-propane bis(4-phenylcarbonate)).

15. The process of claim 9 in which the cocatalyst added is the β-lactone of 2,2,4-trimethyl-3-hydroxy-3-pentenoic acid.

16. A process for preparing a solid, anhydrous ε-caprolactam composition, storable at room temperature and suitable for subsequent, concurrent shaping and polymerization at temperatures in the range of 150° to 190° C., which consists of heating substantially anhydrous ε-caprolactam to a temperature in the range of 80° to 120° C., while sparging with anhydrous nitrogen, with from 0.01 to 10 mole percent, based on the ε-caprolactam, of a base selected from the group consisting of sodium methylate and sodium hydride until substantially all volatile by-products have been eliminated, adjusting the temperature of the resulting composition to the range of 70° to 100° C., mixing therewith as cocatalyst from 0.1 to 2.0 mole percent, based on the caprolactam of an acyl compound capable of causing polymerization of the catalyzed composition at temperatures in the range of 150° to 190° C., and immediately thereafter cooling the resulting composition to a temperature no higher than room temperature until it solidifies.

17. The process of claim 16 in which the cocatalyst is an organic isocyanate.

References Cited by the Examiner

UNITED STATES PATENTS

| | | | |
|---|---|---|---|
| 2,884,414 | 4/1959 | Indest et al. | 260—78 |
| 3,015,652 | 1/1962 | Schnell et al. | 260—78 |
| 3,017,392 | 1/1962 | Butler et al. | 260—78 |
| 3,028,369 | 4/1962 | Butler et al. | 260—78 |
| 3,057,830 | 10/1962 | Corbin | 260—78 |
| 3,138,574 | 6/1964 | Kohan | 260—78 |
| 3,207,713 | 9/1965 | Hyde | 260—78 |
| 3,214,415 | 10/1965 | Giberson | 260—78 |

WILLIAM H. SHORT, *Primary Examiner.*

H. D. ANDERSON, *Assistant Examiner.*